US011448362B2

(12) United States Patent
West et al.

(10) Patent No.: US 11,448,362 B2
(45) Date of Patent: Sep. 20, 2022

(54) AXLE COOLING SYSTEM AND METHOD (71) Applicant: DEERE & COMPANY, Moline, IL (US)

(72) Inventors: Sean P. West, Dubuque, IA (US); Reginald Bindl, Bettendorf, IA (US); Apurb Adarsh, Pune (IN)

(73) Assignee: DEERE & COMPANY, Moline, IL (US)

( * ) Notice: Subject to any disclaimer, the term of this patent is extended or adjusted under 35 U.S.C. 154(b) by 298 days.

(21) Appl. No.: 16/458,410

(22) Filed: Jul. 1, 2019

(65) Prior Publication Data
US 2021/0003249 A1  Jan. 7, 2021

(51) Int. Cl.
*F16N 7/40*  (2006.01)
*F16N 39/02*  (2006.01)
*F16D 65/78*  (2006.01)
*B60B 35/12*  (2006.01)
*F16N 39/06*  (2006.01)

(52) U.S. Cl.
CPC .............. *F16N 7/40* (2013.01); *B60B 35/12* (2013.01); *F16D 65/78* (2013.01); *F16N 39/02* (2013.01); *F16N 39/06* (2013.01); *B60B 2900/513* (2013.01); *F16D 2065/783* (2013.01); *F16D 2065/787* (2013.01); *F16N 2200/10* (2013.01); *F16N 2270/56* (2013.01)

(58) Field of Classification Search
CPC . F16N 7/40; F16N 39/02; F16N 39/06; F16D 65/78; F16D 2065/783; F16D 2065/784; F16D 2065/787; B60B 2900/513
See application file for complete search history.

(56) References Cited

U.S. PATENT DOCUMENTS 5,190,123 A * 3/1993 Hvolka ............... B60T 1/062
188/170
6,135,065 A * 10/2000 Weathers ............ F01P 3/20
123/41.31
(Continued)

FOREIGN PATENT DOCUMENTS

CN    106882135 A    6/2017
CN    209510976 U  * 10/2019
DE    102009026985 A1 *  3/2011  ........... F16D 25/123

OTHER PUBLICATIONS

German Search Report issued in counterpart application No. 102020206868.2 dated Jan. 4, 2021 (10 pages).

*Primary Examiner* — Thomas J Williams
(74) *Attorney, Agent, or Firm* — Taft Stettinius & Hollister LLP; Stephen F. Rost (57) ABSTRACT An axle cooling system for a vehicle that has a first axle hydraulic circuit that passes through a first axle assembly, a second axle hydraulic circuit that passes through a second axle assembly, a first pump that circulates axle oil through the first axle hydraulic circuit, a second pump that circulates axle oil through the second axle hydraulic circuit, a first temperature sensor that monitors a first axle temperature of the first axle assembly, and a second temperature sensor that monitors a second axle temperature of the second axle assembly. The first pump and the second pump are independently controlled from one another to circulate axle oil through the corresponding first or second axle hydraulic circuit.

19 Claims, 4 Drawing Sheets

(56) References Cited

U.S. PATENT DOCUMENTS

| | | | | |
|---|---|---|---|---|
| 6,374,950 | B1 * | 4/2002 | Takeno | F16C 33/1085 |
| | | | | 184/7.4 |
| 6,499,565 | B1 * | 12/2002 | Coyle | F16H 57/0412 |
| | | | | 184/6.12 |
| 6,907,958 | B2 * | 6/2005 | Coyle | F16H 57/0412 |
| | | | | 184/6.12 |
| 7,036,640 | B2 * | 5/2006 | Spielman | F16D 65/78 |
| | | | | 188/264 D |
| 7,845,471 | B2 * | 12/2010 | Bares | F16D 65/853 |
| | | | | 184/6.22 |
| 8,714,310 | B2 * | 5/2014 | Bares | F16D 65/78 |
| | | | | 184/6.22 |
| 8,739,932 | B2 * | 6/2014 | Ramler | F01M 1/10 |
| | | | | 184/6.22 |
| 9,897,253 | B2 * | 2/2018 | Delp | F16N 39/06 |
| 11,320,013 | B1 * | 5/2022 | Fisher | F16D 65/853 |
| 2003/0188937 | A1 * | 10/2003 | Schneider | F16D 66/00 |
| | | | | 188/264 F |
| 2010/0140020 | A1 | 6/2010 | Murahashi | |
| 2012/0266970 | A1 | 10/2012 | Ramler | |
| 2017/0096115 | A1 | 4/2017 | Delp et al. | |

\* cited by examiner

AXLE COOLING SYSTEM AND METHOD

FIELD OF THE DISCLOSURE

The present disclosure relates generally to the field of motorized machinery, and more specifically to a temperature controlled axle cooling system for a vehicle.

BACKGROUND

Work machines, for example articulated dump trucks, have several axles that can heat up during operation from braking and other heat generating tasks. Axle oil flows through the axles to lubricate and cool the axle components. The axle oil has a preferred operating temperature range for most effective use. Excessive heating of the axle oil as well as excessive cooling of the axle oil can be detrimental to the axle oil, as well as to bearings, seals and other axle components.

Many axle cooling systems will run at all times while the engine is running because the pump that drives the axle cooling system is driven off the engine. This results in constant fuel burn with an added load on the engine, and can cause unnecessary cooling of the axles when the axle oil is not up to the preferred operating temperature range. Other systems may selectively run hydraulic systems to turn the axle cooling system and off. These systems typically run the axle cooling system on multiple axles when any one axle is indicating a heated condition and therefore unnecessarily executes a cooling function on the other axles of the system that are not experiencing a heated condition. This unnecessary cooling again increases fuel consumption of the work machine and unnecessarily cools axles that are not experiencing a heated condition.

It would be desirable to have an axle cooling system that could be selectively activated per axle based on the particular temperature conditions of the individual axle.

SUMMARY

One embodiment is an axle cooling system for a vehicle that has a first axle hydraulic circuit that passes through a first axle assembly, a second axle hydraulic circuit that passes through a second axle assembly, a first pump that circulates axle oil through the first axle hydraulic circuit, a second pump that circulates axle oil through the second axle hydraulic circuit, a first temperature sensor that monitors a first axle temperature of the first axle assembly, and a second temperature sensor that monitors a second axle temperature of the second axle assembly. Wherein, the first pump and the second pump are independently controlled from one another to circulate axle oil through the corresponding first or second axle hydraulic circuit.

In one example of this embodiment, when either of the first or second temperature sensors indicate that the corresponding axle temperature is below a low axle temperature threshold, the corresponding first or second pump is deactivated. One aspect of this example includes a first axle oil filter that filters the axle oil as it circulates through the first axle hydraulic circuit, a second axle oil filter that filters the axle oil as it circulates through the second axle hydraulic circuit, a first bypass circuit that monitors a first hydraulic pressure in the first axle hydraulic circuit between the first pump and the first axle oil filter, and a second bypass circuit that monitors a second hydraulic pressure in the second axle hydraulic circuit between the second pump and the second axle oil filter. Wherein, when the first or second hydraulic pressure is less than a pressure threshold, the axle oil circulates through the corresponding first or second axle oil filter. Further wherein, when the first or second hydraulic pressure is at or above the pressure threshold, the first or second axle oil bypasses the corresponding first or second axle oil filter.

In another aspect of this example, when the first axle hydraulic circuit is a closed-loop hydraulic system, the second axle hydraulic circuit is a separate closed-loop hydraulic system, and neither the first or second axle hydraulic circuits shares hydraulic fluid with a main vehicle hydraulic system. This aspect may also have a third axle and the temperature controlled axle cooling system has a third axle hydraulic circuit that passes through the third axle, the third axle hydraulic circuit being a separate closed-loop hydraulic system, and the third axle hydraulic circuit not sharing hydraulic fluid with the main vehicle hydraulic system, a third pump that circulates axle oil through the third axle hydraulic circuit, a third axle oil cooler that cools the axle oil as it circulates through the third axle hydraulic circuit, and a third temperature sensor that monitors a third axle temperature of the third axle.

In yet another example of this embodiment, the first pump is powered by a first electric motor and the second pump is powered by a second electric motor. In one aspect of this example the first electric motor is powered when the first temperature sensor indicates that the first axle temperature is greater than a temperature threshold for a time threshold. In another aspect of this example the second electric motor is powered when the second temperature sensor indicates that the second axle temperature is greater than the temperature threshold for the time threshold.

Another embodiment is a system for cooling brakes that has a first axle assembly having a first axle hydraulic circuit, a first brake assembly positioned at least partially within the first axle assembly, a first pump that selectively circulates axle oil through the first axle hydraulic circuit, a first electric motor coupled to the first pump to selectively engage the first pump, a first temperature sensor that identifies an axle temperature of the first axle assembly, a controller in communication with the first temperature sensor and the first electric motor. In this embodiment, the controller selectively engages the first electric motor when the first temperature sensor identifies that the axle temperature is above a high temperature threshold.

In one example of this embodiment a first inverter provides electrical power to the first electric motor and the controller communicates with the first inverter to selectively power the first motor. In another example the controller selectively disengages the first electric motor when the first temperature sensor identifies that the axle temperature is below the high temperature threshold.

Yet another example of this embodiment has a second axle assembly having a second axle hydraulic circuit, a second brake assembly positioned at least partially within the second axle assembly, a second pump that selectively circulates axle oil through the second axle hydraulic circuit, a second electric motor coupled to the second pump to selectively engage the second pump, and a second temperature sensor that identifies an axle temperature of the second axle assembly. In this example, the controller selectively engages the second electric motor when the second temperature sensor identifies that the axle temperature of the second axle assembly is above the high temperature threshold. In one aspect of this example, when the first temperature sensor identifies that the axle temperature of the first axle assembly is above the high temperature threshold and the second temperature sensor identifies that the axle temperature of the second axle assembly is below the high temperature threshold the controller engages only the first electric motor to provide fluid flow through the first axle hydraulic circuit.

Another aspect of this example has a third axle assembly having a third axle hydraulic circuit, a third brake assembly positioned at least partially within the third axle assembly, a third pump that selectively circulates axle oil through the third axle hydraulic circuit, a third electric motor coupled to the third pump to selectively engage the third pump, and a third temperature sensor that identifies an axle temperature of the third axle assembly. In this aspect, the controller selectively engages the third electric motor when the third temperature sensor identifies that the axle temperature of the third axle assembly is above the high temperature threshold. In part of this aspect, the controller independently powers any one or more of the first electric motor, the second electric motor, or the third electric motor when the corresponding first temperature sensor, second temperature sensor, or third temperature sensor indicate the axle temperature of the corresponding first axle assembly, second axle assembly, or third axle assembly is above the high temperature threshold.

Yet another embodiment of this disclosure is a method for controlling an axle cooling system for a vehicle, the method includes providing a first axle assembly, a first pump that selectively provides fluid flow through a first axle hydraulic circuit, a second axle assembly, a second pump that selectively provides fluid flow through a second axle hydraulic circuit, and a controller in communication with a first temperature sensor that identifies a first axle temperature and a second temperature sensor that identifies a second axle temperature, monitoring, with the controller, the first temperature sensor to identify the first axle temperature, monitoring, with the controller, the second temperature sensor to identify the second axle temperature, comparing the first and second axle temperature to a temperature threshold, and initiating a cooling response, with the controller, in either of the first axle assembly or the second axle assembly when the corresponding first or second axle temperature is above a temperature threshold. In this embodiment, when the first axle temperature is above the temperature threshold and the second axle temperature is below the temperature threshold, the cooling response is initiated in the first axle hydraulic circuit and the cooling response is not initiated in the second axle hydraulic circuit.

One example of this embodiment includes providing a first electric motor coupled to the first pump and a second electric motor coupled to the second pump. In this example, the initiating a cooling response step comprises providing instructions from the controller to power the corresponding first or second motor to provide fluid flow through the corresponding first axle hydraulic circuit or second axle hydraulic circuit. A further part of this aspect includes providing a first inverter that selectively couples the first electric motor to an alternator and a second inverter that selectively couples the second electric motor to the alternator. In this part, the initiating a cooling response step comprises providing instructions from the controller to the first inverter and second inverter to power the corresponding first or second motor.

Another example of this embodiment includes providing a third axle assembly, a third pump that selectively provides fluid flow through a third axle hydraulic circuit, and a third temperature sensor that identifies a third axle temperature to the controller. Monitoring, with the controller, the third temperature sensor to identify the third axle temperature. Comparing the third axle temperature to the temperature threshold. Initiating the cooling response, with the controller, in the third axle assembly when the third axle temperature is above the temperature threshold. In this example, the controller only initiates the cooling response in the first, second, or third axle assembly that has a corresponding first, second, or third axle temperature that is above the temperature threshold.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

A temperature controlled axle cooling and filtration system can be designed to turn on or off depending on the temperature of the vehicle, for example an articulated dump truck (ADT). For ADTs, heat is primarily generated in the axles during braking and high speed transport operations. The axle cooling system can remain inactive until the axle oil reaches a given temperature threshold. When the axle oil reaches the given temperature threshold, the axle cooling system can activate and supply cooling to the vehicle axles as needed to ensure the axles and brakes do not overheat.

Figure 1:
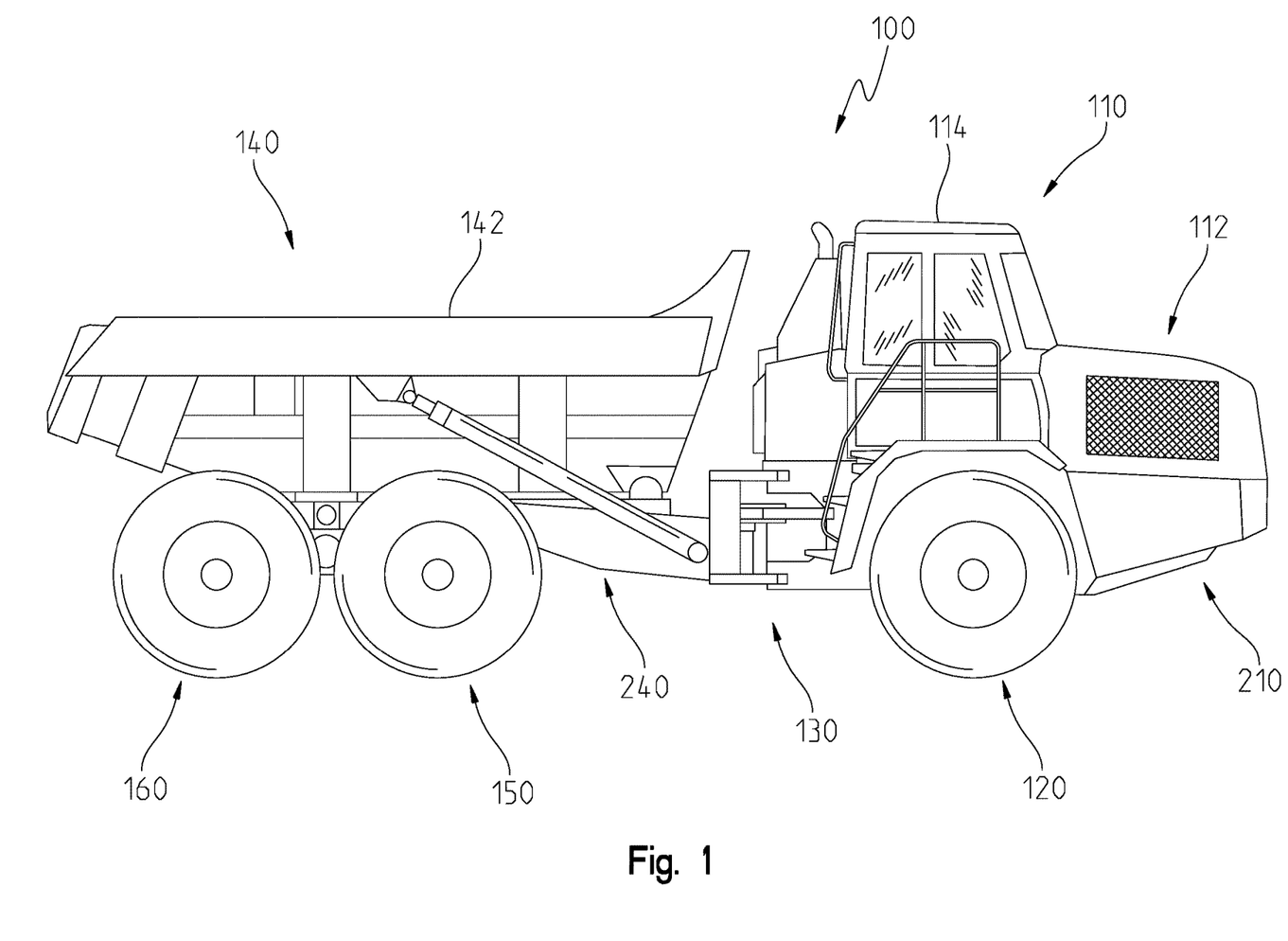
FIG. 1 is an exemplary vehicle having an engine and multiple axles.

Referring to FIG. 1 of the present disclosure, an exemplary dump vehicle 100 including a power head section 110 and a load carrying section 140 is illustrated. The power head section 110 includes a vehicle engine or motor 112, an operator cab 114 and a front axle and wheels 120 which are all coupled to a front frame 210. The load carrying section 140 includes a dump body 142, a mid-axle and wheels 150 and a rear axle and wheels 160 which are all coupled to a rear frame 240. The front frame 210 of the power head section 110 is coupled to the rear frame 240 of the load carrying section 140 by articulation and oscillation joints 130. The articulation joint enables the power head section 110 and the load carrying section 140 to pivot relative to one another about a vertical axis for steering the vehicle 100, and the oscillation joint allows the power head section 110 and the load carrying section 140 to rotate relative to one another about a longitudinal axis extending along the length of the vehicle 100.

Figure 2:
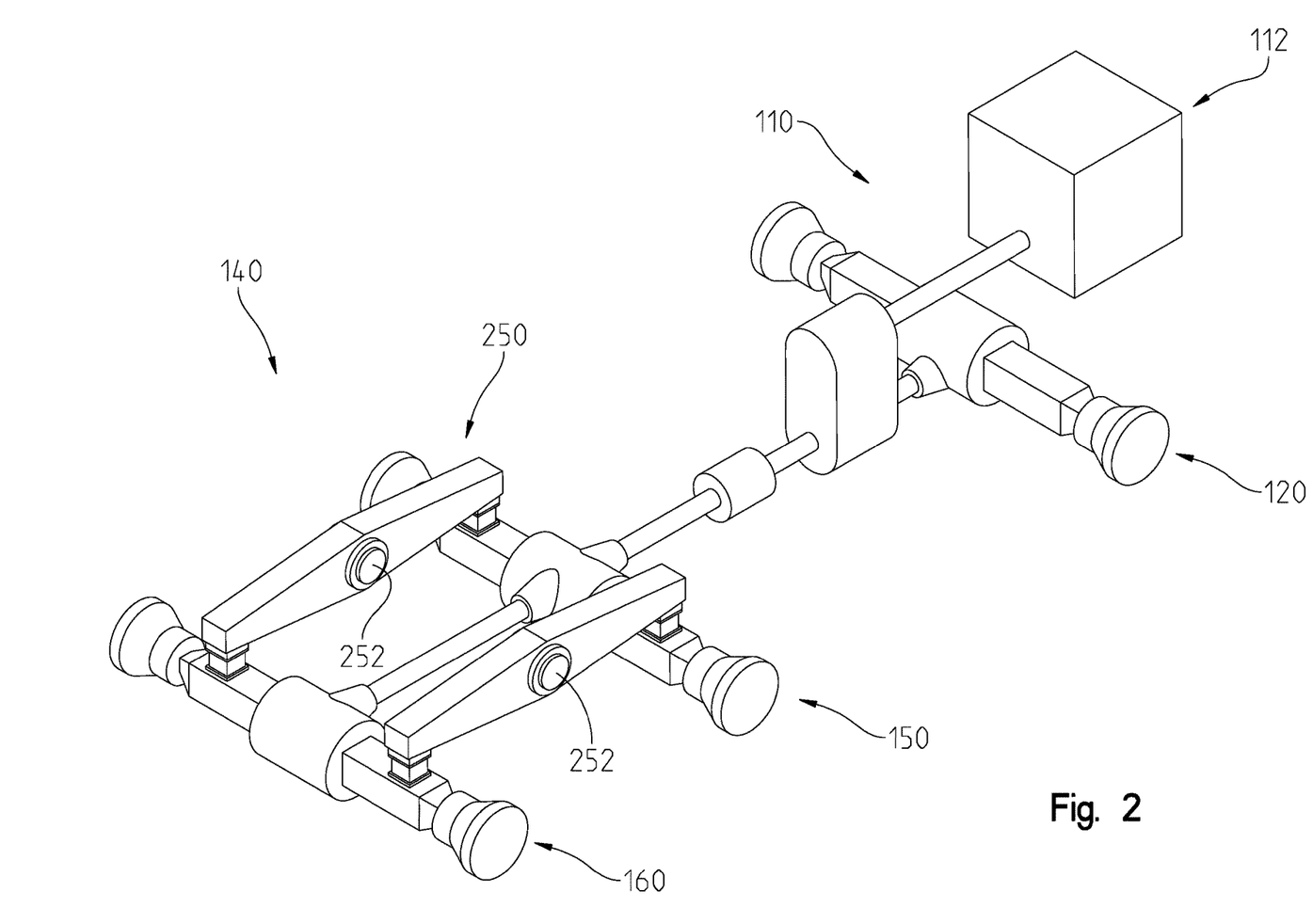
FIG. 2 illustrates a schematic of an exemplary arrangement of front and rear axles of a vehicle.

Referring now to FIG. 2, an exemplary front and rear axle arrangements for the power head section 110 and load carrying section 140, respectively, of the dump vehicle 100 is illustrated. The exemplary embodiment of FIG. 2 includes a bogie axle arrangement 250 connected to the rear frame 240. In this embodiment, the mid-axle 150 and the rear axle 160 are connected in the bogie axle arrangement 250, and the bogie axle arrangement 250 is connected by a bogie pivot joint 252 to the rear frame 240. The bogie pivot joint 252 is located between the mid-axle 150 and the rear axle 160. The bogie pivot joint 252 of the bogie axle arrangement 250 allows the mid-axle 150 and the rear axle 160 to pivot about an axis running through the bogie pivot joint 252 that is perpendicular to the rear frame 240 which enables the mid and rear axles and wheels 150, 160 to have a different inclination angle than the rear frame 240.

An axle cooling system can include temperature sensors, on/off solenoid valves, motors, pumps, filters, and a control system among other things. The temperature sensors can be positioned in the axles and monitor the temperature of the axle oil in each axle. Alternatively the temperature sensors may be mounted along any conduit or the like that directs axle oil whether in the axle or external thereto. When the axle oil reaches a threshold temperature, the axle cooling system can engage one or more pumps to initiate axle oil flow.

The axle cooling system can include a front motor pump mounted to the front frame of the vehicle, a mid motor pump mounted to a middle portion of the rear frame, and a rear motor pump mounted a rear portion of the rear frame of the vehicle. Each motor pump includes a motor that drives one or more pumps. In one aspect of this disclosure, each motor pump may be driven by an electric motor and each electric motor can drive the pumps of the motor pumps to circulate axle oil to the corresponding axles. The front motor pump can circulate axle oil through a closed front axle oil circuit, the middle motor pump can circulate axle oil through a closed middle axle oil circuit, and the rear motor pump can circulate axle oil through a closed rear axle oil circuit. In one aspect of this disclosure, each one of the axle oil circuits can be a closed system to prevent cross axle contamination. The flow in each of the axle oil circuits circulates the axle oil to cool and filter the axles and axle oil.

Figure 3:
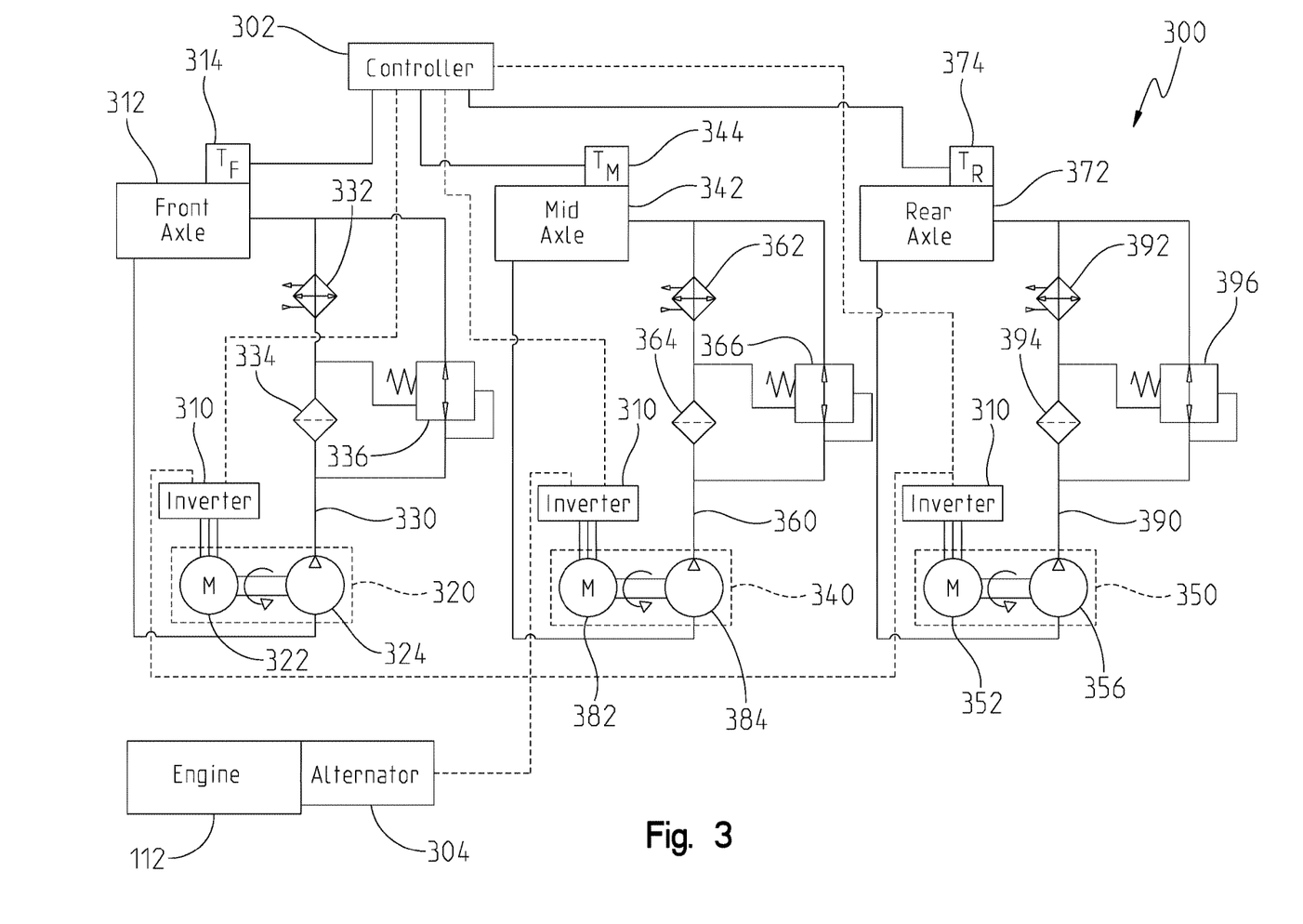
FIG. 3 illustrates an exemplary embodiment of an axle oil cooling system for cooling a front axle, a mid-axle, and a rear axle of a vehicle.

FIG. 3 illustrates an exemplary embodiment of an axle cooling system 300 for cooling a front axle 312, a mid-axle 342, and a rear axle 372 of a vehicle. The axle cooling system 300 includes a controller 302, a front axle temperature sensor 314, a mid-axle temperature sensor 344, a rear axle temperature sensor 374, a front axle closed-loop hydraulic circuit 330, a mid-axle closed-loop hydraulic circuit 360, a rear axle closed-loop hydraulic circuit 390, a front motor/pump 320, a mid motor/pump 340 and a rear motor/pump 350. The front motor/pump 320 includes a front motor 322 that drives a front pump 324 that, when activated, pumps axle oil through the front axle closed-loop hydraulic circuit 330. The mid motor/pump 340 includes a mid motor 382 that drives a mid pump 384 that, when activated, pumps axle oil through the mid axle closed-loop hydraulic circuit 360. The rear motor/pump 350 includes a rear motor 352 that drives a rear pump 356. When the rear motor/pump 350 is activated, it pumps axle oil through the rear axle closed-loop hydraulic circuit 390.

The front axle temperature sensor 314 monitors the temperature of the axle oil circulating in the front axle hydraulic circuit 330 as it flows through the front axle 312. The mid-axle temperature sensor 344 monitors the temperature of the axle oil circulating in the mid-axle hydraulic circuit 360 as it flows through the mid-axle 342. The rear axle temperature sensor 374 monitors the temperature of the axle oil circulating in the rear axle hydraulic circuit 390 as it flows through the rear axle 372. The temperature sensors can directly measure the axle oil temperature or can measure a related temperature and the controller 302 can model the associated axle oil temperature.

The temperature sensors 314, 344, 374 may be located anywhere along the relative hydraulic circuits 330, 360, 390 that can indicate the temperature of the axle oil therein. In one non-exclusive example, the temperature sensors may be positioned within an axle tube of the corresponding axles. In another embodiment, the temperature sensors are fluidly couple to an axle fluid line that is positioned outside of the corresponding axle tube. In yet another embodiment, the temperature sensors are coupled directly to the corresponding axle tube. Regardless of their location, the readings from the temperature sensors 314, 344, 374 are received by the controller 302 which further controls the corresponding motors 322, 382, 352.

The front axle hydraulic circuit 330 also includes a front axle cooler 332, and can optionally include a front axle filter 334 and/or a front axle bypass circuit 336. The front axle bypass circuit 336 can bypass the front axle filter 334, or can bypass both the front axle filter 334 and the front axle cooler 332. The mid-axle hydraulic circuit 360 also includes a mid-axle cooler 362, and can optionally include a mid-axle filter 364 and/or a mid-axle bypass circuit 366. The mid-axle bypass circuit 366 can bypass the mid-axle filter 364, or can bypass both the mid-axle filter 364 and the mid-axle cooler 362. The rear axle hydraulic circuit 390 also includes a rear axle cooler 392, and can optionally include a rear axle filter 394 and/or a rear axle bypass circuit 396. The rear axle bypass circuit 396 can bypass the rear axle filter 394, or can bypass both the rear axle filter 394 and the rear axle cooler 392.

In one aspect of this disclosure, the engine 112 may have an alternator 304 or the like coupled thereto to convert mechanical energy to electrical energy as is known in the art. The electrical energy created by the alternator may either be selectively distributed to electrical systems of the work machine or stored in capacitors, batteries, or the like. Regardless of the source of the electrical energy, each motor 322, 382, 352 may be an electric motor that is selectively provided electrical energy via the controller 302 to power the corresponding pumps 324, 384, 356.

In one aspect of this disclosure, each motor 322, 382, 352 may have an inverter 310 electrically coupled thereto to control the corresponding motor. The controller 302 may communicate with each inverter 310 to selectively power the corresponding motor 322, 382, 352. In this configuration, the controller 302 may selectively alter the fluid flow in each of the hydraulic circuits 330, 360, 390 independently from one another by selectively powering the corresponding motors 322, 382, 352. In other words, the controller 302 may provide fluid flow in the front axle hydraulic circuit 330 by communicating with the inverter 310 to provide electrical power to the front motor 322. As the front motor 322 is powered, the front pump 324 is engaged by the front motor 322 through a mechanical coupling and axle oil is circulated through the front axle hydraulic circuit 330.

The mid axle hydraulic circuit 360 may similarly be independently controlled by the controller 302 relative to the front axle hydraulic circuit 330 and the rear axle hydraulic circuit 390. More specifically, the controller 302 may provide fluid flow in the mid axle hydraulic circuit 360 by communicating with the inverter 310 to provide electrical power to the mid motor 382. As the mid motor 382 is powered, the mid pump 384 is engaged by the mid motor 382 through a mechanical coupling and axle oil is circulated through the mid axle hydraulic circuit 360. Similarly, the rear axle hydraulic circuit 390 may be independently controlled by the controller 302 relative to the front axle hydraulic circuit 330 and the mid axle hydraulic circuit 360. The controller 302 may provide fluid flow in the rear axle hydraulic circuit 390 by communicating with the inverter 310 to provide electrical power to the rear motor 352. As the rear motor 352 is powered, the rear pump 356 is engaged by the rear motor 352 through a mechanical coupling and axle oil is circulated through the rear axle hydraulic circuit 390.

In other words, the controller 302 can independently control the axle oil flow in each of the front, mid, and rear hydraulic circuits 330, 360, 390 independently from one another. In this configurations, each hydraulic circuit 330, 360, 390 may be independently engaged to produce fluid flow based on the temperature readings associated with the each specific axle 312, 342, 372. More specifically, the controller 302 can instruct the inverters 310 to withhold power from each motor 322, 382, 352 until the corresponding axle temperature sensors 314, 344, 374 indicate an axle temperature that is above a threshold temperature. When the controller 302 instructs the inverters 310 to withhold electrical power from the corresponding motors 322, 382, 352, the corresponding pumps 324, 384, 356 are substantially inactive and axle oil does not substantially flow through the hydraulic circuits 330, 360, 390. In this configuration, the electrical power generated and stored by the work machine may be allocated to other systems. In one aspect of this disclosure, when the motors 322, 382, 352 are not powered, the load on the alternator 304 may be reduced and the engine 112 may operate in a more fuel efficient mode.

The controller 302 may also control the rotation speed of the corresponding motors 322, 382, 352 to thereby alter the flow rate of the pump 324, 384, 356 coupled thereto. In this configuration, the controller 302 may operate the motors 322, 382, 352 at lower speeds when the axle oil temperatures are mildly above the temperature threshold and at greater speeds when the axle oil temperatures are highly above the temperature threshold. In other words, the controller 302 may independently control the flow rate of axle oil moved by the motor pumps 320, 340, 350 of each axle 312, 342, 372 independently from one another to ensure the axle oil in each axle is being properly cooled.

In one aspect of the axle cooling system 300, if the axle temperature sensors 314, 344, 374 indicate readings below the threshold temperature for an extended period of time, the controller 302 can instruct the inverters 310 to power the corresponding motor/pumps 320, 340, 350 for a predetermined time duration to filter the axle oil in the closed-loop axle hydraulic circuits 330, 360, 390. Further still, in another aspect of this disclosure the controller 302 may pump axle oil through the corresponding axle hydraulic circuity 330, 360, 390 that are below a low threshold temperature to heat the axle oil.

When any one of the axle temperature sensors 314, 344, 374 goes above a high threshold temperature, the axle cooling controller 302 can engage the corresponding motor pump 320, 340, 350 be sending a signal to the corresponding inverter 310 to power the corresponding motor 322, 382, 352. The controller 302 can independently provide axle fluid flow to any one or more of the front axle 312, mid axle 342, and rear axle 372 when the corresponding axle temperature sensor 314, 344, 374 indicates temperatures above the high threshold temperature. Accordingly, in one exemplary embodiment only one of the hydraulic circuits 330, 360, 390 may provide a flow of axle oil there through while the remaining hydraulic circuits 330, 360, 390 are substantially stagnate. Alternatively, any two hydraulic circuits 330, 360, 390 may provide axle oil flow there through while the remaining hydraulic circuit 330, 360, 390 is stagnate. In yet another example, each hydraulic circuit 330, 360, 390 may provide axle oil flow there through substantially simultaneously. Further still, the flow rate of axle oil through each hydraulic circuit 330, 360, 390 may vary relative to one another.

When the front motor 322 drives the front pump 324, the front pump 324 pumps axle oil through the closed-loop front axle hydraulic circuit 330. In the embodiment of FIG. 3, the front pump 324 pumps axle oil through the front axle filter 334 which filters the axle oil and then through the front axle cooler 332 which cools the axle oil and then through the front axle 312. After passing through the front axle 312, the axle oil circulates back to the front pump 324 to be recirculated through the front axle hydraulic circuit 330. If the front axle filter 334 or front axle cooler 332 becomes clogged and hydraulic pressure builds in the front axle hydraulic circuit 330, the front axle bypass circuit 336 can activate to permit flow around the front axle filter 334 and/or the front axle cooler 332 to lower hydraulic pressure in the front axle hydraulic circuit 330.

When the mid motor 382 drives the mid-pump 384, the mid-pump 384 pumps axle oil through the closed-loop mid-axle hydraulic circuit 360. In the embodiment of FIG. 3, the mid-pump 384 pumps axle oil through the mid-axle filter 364 which filters the axle oil and then through the mid-axle cooler 362 which cools the axle oil and then through the mid-axle 342. After passing through the mid-axle 342, the axle oil circulates back to the mid-pump 384 to be recirculated through the mid-axle hydraulic circuit 360. If the mid-axle filter 364 or mid-axle cooler 362 becomes clogged and hydraulic pressure builds in the mid-axle hydraulic circuit 360, the mid-axle bypass circuit 366 can activate to permit flow around the mid-axle filter 364 and/or the mid-axle cooler 362 to lower hydraulic pressure in the mid-axle hydraulic circuit 360.

When the rear motor 352 drives the rear pump 356, the rear pump 356 pumps axle oil through the closed-loop rear axle hydraulic circuit 390. In the embodiment of FIG. 3, the rear pump 356 pumps axle oil through the rear axle filter 394 which filters the axle oil and then through the rear axle cooler 392 which cools the axle oil and then through the rear axle 372. After passing through the rear axle 372, the axle oil circulates back to the rear pump 356 to be recirculated through the rear axle hydraulic circuit 390. If the rear axle filter 394 or rear axle cooler 392 becomes clogged and hydraulic pressure builds in the rear axle hydraulic circuit 390, the rear axle pressure relief bypass circuit 396 can activate to permit flow around the rear axle filter 394 and/or the rear axle cooler 392 to lower hydraulic pressure in the rear axle hydraulic circuit 390.

In the embodiment of FIG. 3, each one of the axle oil hydraulic circuits 330, 360, 390 is a closed system to prevent cross axle contamination and the flow in each of the axle oil hydraulic circuits 330, 360, 390 circulates the axle oil to cool and filter the axles and axle oil. Alternative embodiments could enable the flow of axle oil between one or more of the axles. For example the mid and rear axles 342, 372 could have a single hydraulic circuit with a single pump that circulates axle oil through both axles, and filters and cools the axle oil and both axles.

Figure 4:
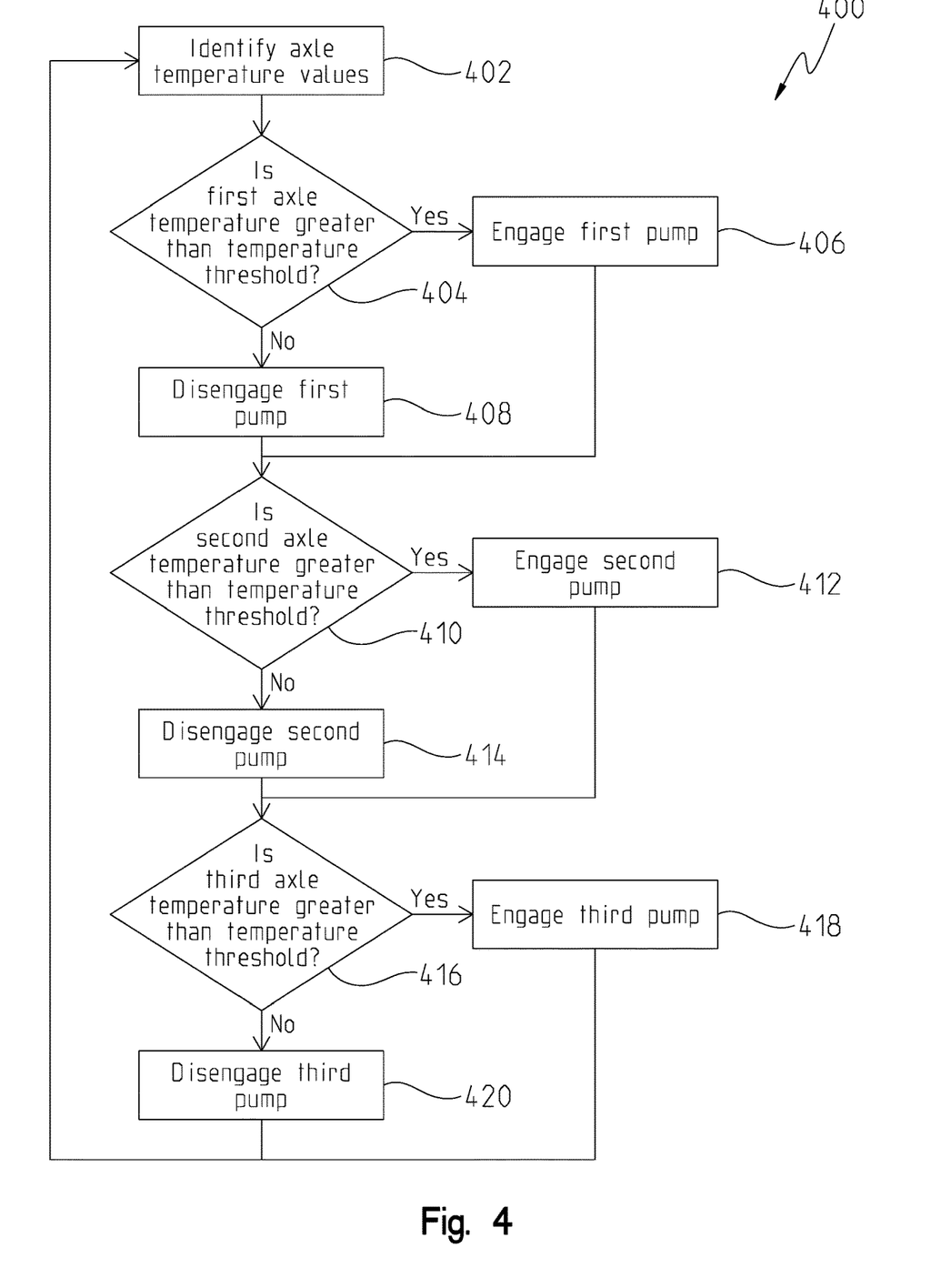
FIG. 4 illustrates an exemplary control process that can be implemented in an axle cooling controller for an axle cooling system.

FIG. 4 illustrates an exemplary control process 400 for the axle cooling system of FIG. 3. The control process 400 may involve the controller 302 communicating with the temperature sensors 314, 344, 474 to identify the axle temperature values in box 402. In one non-exclusive example, the temperature values identified in box 402 may be indicative of the temperature of the axle oil in the corresponding axles 312, 342, 372. As is known in the art, often braking assemblies are positioned within an axle tube of the axles. In this configuration, prolonged or heavy braking conditions cause the brakes to generate heat. The brakes are cooled by the axle oil and in turn heavy or prolonged braking conditions may cause the axle oil temperature to increase. In box 402, the axle oil temperature is monitored by the controller 302 to identify when the axle oil is getting hotter than desired.

As part of the control process 400, the temperature of each axle 312, 342, 372 may be compared to a temperature threshold after the axle temperature values are identified. The temperature threshold may be a preset temperature stored in a memory unit of the controller 302 or elsewhere. Further, the temperature threshold may be altered by a user through a user interface or the like. In one embodiment, the temperature threshold is a temperature above which the axle oil begins to lose effective lubricating and cooling properties.

In box 404, the temperature value for the front axle temperature sensor 314 is compared to the temperature threshold by the controller 302. If the temperature value for the front axle temperature sensor 314 is at or above the temperature threshold, the controller 302 may engage the front motor 322 to begin circulating axle oil through the front axle hydraulic circuit 330 in box 406. In box 406, the controller 302 has identified a temperature condition in the front axle 312 that requires cooling. Accordingly, in box 406 the controller 302 sends a signal to the inverter 310 of the front motor 322 to provide torque to, or otherwise power, the front pump 324 to circulate the axle oil through the front axle cooler 332 to thereby cool the axle fluid.

If the controller 302 determines that the first axle temperature is less than the temperatures threshold, the controller 302 may disengage the front pump 324 in box 408. In box 408 the controller 302 may first check whether the front motor 322 is currently being powered. However, regardless of the current state of the front motor 322 the controller 302 may either send a signal to the inverter 310 of the front motor 322 to ensure the front motor 322 is not powered or keep the front motor 322 in an unpowered state. In box 408, the controller 302 has identified that the axle oil of the front axle 312 is below the temperature threshold and does not need cooled by the front axle hydraulic circuit 330.

After box 404, either after executing box 406 or 408, the controller may execute box 410. In box 410, the temperature value for the mid axle temperature sensor 344 is compared to the temperature threshold by the controller 302. If the temperature value for the mid axle temperature sensor 344 is at or above the temperature threshold, the controller 302 may engage the mid motor 382 to begin circulating axle oil through the mid axle hydraulic circuit 360 in box 412. In box 412, the controller 302 has identified a temperature condition in the mid axle 342 that requires cooling. Accordingly, in box 412 the controller 302 sends a signal to the inverter 310 of the mid motor 382 to provide torque to, or otherwise power, the mid pump 384 to circulate the axle oil through the mid axle cooler 362 to thereby cool the axle fluid.

If the controller 302 determines that the mid or second axle temperature is less than the temperatures threshold, the controller 302 may disengage the mid pump 384 in box 414. In box 414 the controller 302 may first check whether the mid motor 382 is currently powered. However, regardless of the current state of the mid motor 382 the controller 302 may either send a signal to the inverter 310 of the mid motor 382 to ensure the mid motor 382 is not powered or keep the mid motor 382 in an unpowered state. In box 414, the controller 302 has identified that the axle oil of the mid axle 342 is below the temperature threshold and does not need cooled by the mid axle hydraulic circuit 360.

After box 410, either after executing box 412 or 414, the controller 302 may execute box 416. In box 416, the temperature value for the rear axle temperature sensor 374 is compared to the temperature threshold by the controller 302. If the temperature value for the rear axle temperature sensor 374 is at or above the temperature threshold, the controller 302 may engage the rear motor 352 to begin circulating axle oil through the rear axle hydraulic circuit 390 in box 418. In box 418, the controller 302 has identified a temperature condition in the rear axle 372 that requires cooling. Accordingly, in box 418 the controller 302 sends a signal to the inverter 310 of the rear motor 352 to provide torque to, or otherwise power, the rear pump 356 to circulate the axle oil through the rear axle cooler 392 to thereby cool the axle fluid.

If the controller 302 determines that the rear or third axle temperature is less than the temperatures threshold, the controller 302 may disengage the rear pump 356 in box 420. In box 420 the controller 302 may first check whether the rear motor 352 is currently powered. However, regardless of the current state of the rear motor 352 the controller 302 may either send a signal to the inverter 310 of the rear motor 352 to ensure the rear motor 352 is not powered or keep the rear motor 352 in an unpowered state. In box 420, the controller 302 has identified that the axle oil of the rear axle 372 is below the temperature threshold and does not need cooled by the rear axle hydraulic circuit 390.

While the control process 400 is illustrated sequentially in FIG. 4, this disclosure contemplates executing the control process 400 in different sequences as well. More specifically, the controller may simultaneously execute each of boxes 404, 410, 416. Further, the controller may check the temperature sensor 344 of the mid axle 342 before the front sensor 314 or the rear sensor 374. Further still, this disclosure contemplates executing the control process 400 substantially continuously while the vehicle 100 is on or otherwise powered. That is to say, this control process can be repeated at any known frequency to ensure that the axle oil does not become overly heated before the corresponding pumps 324, 384, 356 are engaged to cool the axle oil.

In another aspect of this disclosure, motors 322, 382, 352 may be electric motors and the controller 302 may alter the rotation speed of the motors based on the corresponding temperature of the axle oil. As one non-limiting example, the controller may store a low, medium, and high temperature threshold therein. If the controller 302 identifies a temperature reading between the low and medium temperature threshold, the controller 302 may operate the corresponding motor 322, 382, 352 at a low rotation speed to thereby pump the axle fluid through the corresponding hydraulic circuit 330, 360, 390 at a low flow rate. Similarly, if the controller 302 identifies a temperature reading between the medium and high temperature threshold, the controller 302 may operate the corresponding motor 322, 382, 352 at a medium rotation speed to thereby pump the axle fluid through the corresponding hydraulic circuit 330, 360, 390 at a medium flow rate. Further still, if the controller 302 identifies a temperature reading above the high temperature threshold, the controller 302 may operate the corresponding motor 322, 382, 352 at a high rotation speed to thereby pump the axle fluid through the corresponding hydraulic circuit 330, 360, 390 at a high flow rate. Alternatively, the controller 302 may calculate the rotation speed of each motor 322, 382, 352 as a product of the corresponding temperature sensor reading 314, 344, 374.

As will be appreciated with reference to the control process 400, each axle 312, 342, 372 may be cooled independently of the others. That is to say, each motor/pump 320, 340, 350 may be independently controlled by the controller 302 to cool axle fluid in the overheated axle 312, 342, 372. In this configuration, the vehicle 100 may efficiently cool the axles 312, 342, 372 that are getting hot without engaging the pumps 324, 384, 356 to axles 312, 342, 372 that are operating within acceptable temperatures.

In yet another aspect of this disclosure, the motor pumps 320, 340, 350 may be independently engaged to circulate axle oil through the corresponding hydraulic circuits 330, 360, 390 when the axle oil temperature is lower than a cold temperature threshold. In this configuration, a control logic similar to FIG. 4 may be implemented to engage the motor pumps 320, 340, 350 when the temperature sensors 314, 344, 374 indicate an axle temperature that is less than the cold temperature threshold. In this example, utilizing the motor pumps 320, 340, 350 to circulate during a cold condition may increase the temperature of the axle oil to be within a desired working range. Accordingly, the teachings of this disclosure are also contemplated herein as being used to increase the axle oil temperature under certain conditions.

The controller 302 referred to herein may be any type of known controller that can execute stored commands or the like. In one non-exclusive example, the controller may have a processor and a memory unit. The memory unit may store algorithms and the like along with threshold values and formulas utilized by the control logic of FIG. 4. The controller may be any controller on a vehicle and may perform other functions as well. Further still, the term controller may refer to multiple controllers working together to execute the logic discussed herein. A person skilled in the art understands the many different types of controllers that can implement the teachings of this disclosure and this disclosure is not limited to any particular type of controller.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An axle cooling system for a vehicle having a main vehicle hydraulic system having a main vehicle hydraulic fluid, comprising:
   a first axle closed-loop hydraulic circuit that passes through a first axle assembly, wherein the first axle closed-loop hydraulic circuit operates independently of the main hydraulic system and does not depend on fluid flow of the main hydraulic fluid to circulate first axle oil through the first axle closed-loop hydraulic circuit;
   a second axle closed-loop hydraulic circuit that passes through a second axle assembly, wherein the second axle closed-loop hydraulic circuit operates independently of the main hydraulic system and does not depend on fluid flow of the main hydraulic fluid to circulate second axle oil through the second axle closed-loop hydraulic circuit;
   wherein the first axle closed-loop hydraulic circuit includes a first motor pump that circulates the first axle oil through the first axle closed-loop hydraulic circuit, wherein the first motor pump includes a first pump powered by a first electric motor;
   wherein the second axle closed-loop hydraulic circuit includes a second motor pump that circulates the second axle oil through the second axle closed-loop hydraulic circuit, wherein the second motor pump includes a second pump powered by a second electric motor;
   a first temperature sensor that monitors a first axle temperature of the first axle assembly;
   a second temperature sensor that monitors a second axle temperature of the second axle assembly;
   wherein, the first motor pump and the second motor pump are independently controlled from one another with a controller to circulate the first axle oil through the first axle closed-loop hydraulic circuit or to circulate the second axle oil through the second axle closed-loop hydraulic circuit, wherein neither the first axle closed-loop hydraulic circuit nor the second axle closed-loop hydraulic circuit responds to main vehicle hydraulic fluid flowing through the main vehicle hydraulic system;
   wherein the controller independently activates each of the first electric motor pump and the second electric motor pump to independently control the flow rate of the first axle oil moved by the first motor pump and the flow rate of the second axle oil moved by the second motor pump; and
   wherein activation of the first motor pump does not activate the second motor pump.

2. The axle cooling system of claim 1, wherein when either of the first or second temperature sensors indicate that the corresponding axle temperature is below a low axle temperature threshold, the corresponding first or second pump is deactivated by placing the first or second electric motor in an unpowered state.

3. The axle cooling system of claim 2, further comprising:
   a first axle oil filter that filters the first axle oil as it circulates through the first axle closed-loop hydraulic circuit;
   a second axle oil filter that filters the second axle oil as it circulates through the second axle closed-loop hydraulic circuit;
   a first bypass circuit that monitors a first hydraulic pressure in the first axle closed-loop hydraulic circuit between the first pump and the first axle oil filter; and
   a second bypass circuit that monitors a second hydraulic pressure in the second axle closed-loop hydraulic circuit between the second pump and the second axle oil filter;

wherein, when the first or second hydraulic pressure is less than a pressure threshold, the first axle oil or the second axle oil circulates through the corresponding first or second axle oil filter.

4. The axle cooling system of claim 3, further wherein, when the first or second hydraulic pressure is at or above the pressure threshold, the first axle oil or second axle oil bypasses the corresponding first axle oil filter or second axle oil filter.

5. The axle cooling system of claim 4, wherein the vehicle further comprises a third axle assembly; and the axle cooling system further comprises:
   a third axle closed-loop hydraulic circuit that passes through the third axle assembly, the third axle closed-loop hydraulic circuit being a separate closed-loop hydraulic system from each of the first axle closed-loop hydraulic circuit and the second axle closed-loop hydraulic circuit, and the third axle closed-loop hydraulic circuit does not depend on fluid flow of the main vehicle hydraulic fluid to circulate third axle oil through the third axle closed-loop hydraulic circuit,
   wherein the third axle closed-loop hydraulic circuit includes a third motor pump that circulates third axle oil through the third axle closed-loop hydraulic circuit, wherein the third motor pump includes a third pump powered by a third electric motor;
   a third axle oil cooler that cools the third axle oil as it circulates through the third axle closed-loop hydraulic circuit;
   a third temperature sensor that monitors a third axle temperature of the third axle; and
   wherein the third axle closed-loop hydraulic circuit is a closed system with respect to both the first axle closed-loop hydraulic circuit and the second axle closed-loop hydraulic circuit to prevent cross axle contamination; and
   wherein activation of the second motor pump does not activate the third motor pump.

6. The axle cooling system of claim 1, further wherein the first electric motor is powered when the first temperature sensor indicates that the first axle temperature is greater than a temperature threshold for a time threshold.

7. The axle cooling system of claim 6, further wherein the second electric motor is powered when the second temperature sensor indicates that the second axle temperature is greater than the temperature threshold for the time threshold.

8. The axle cooling system of claim 1, wherein the first motor pump is not coupled to the second motor pump.

9. A system for cooling brakes of a vehicle having a main hydraulic system having a main hydraulic fluid, comprising:
   a first axle assembly having a first axle closed-loop hydraulic circuit, wherein the first axle closed-loop hydraulic circuit operates independently of the main hydraulic system and does not depend on fluid flow of the main hydraulic fluid to circulate a first axle oil through the first axle closed-loop hydraulic circuit;
   a first brake assembly positioned at least partially within the first axle assembly;
   a first motor pump that selectively circulates the first axle oil through the first axle closed-loop hydraulic circuit, wherein the first motor pump includes a first pump powered by a first electric motor;
   wherein the first electric motor is coupled to the first pump to selectively engage the first pump;
   a first temperature sensor that identifies an axle temperature of the first axle assembly;
   a second axle assembly having a second axle closed-loop hydraulic circuit, wherein the second axle closed-loop hydraulic circuit includes a second motor pump and operates independently of the main hydraulic system and does not depend on fluid flow of the main hydraulic fluid to circulate a first axle oil through the first axle closed-loop hydraulic circuit;
   a controller in communication with the first temperature sensor, the first electric motor, and the second closed loop hydraulic circuit;
   wherein, the controller selectively engages the first electric motor to activate the first pump when the first temperature sensor identifies that the axle temperature is above a high temperature threshold;
   wherein the first axle closed-loop hydraulic circuit is a closed system that does not receive and does not share hydraulic fluid with the main vehicle hydraulic system; and
   wherein activation of the first motor pump does not activate the second motor pump.

10. The system of claim 9, further wherein a first inverter provides electrical power to the first electric motor and the controller communicates with the first inverter to selectively power the first electric motor.

11. The system of claim 9, further wherein the controller selectively disengages the first electric motor when the first temperature sensor identifies that the axle temperature is below the high temperature threshold.

12. The system of claim 9, further comprising:
   a second brake assembly positioned at least partially within the second axle assembly;
   wherein the second motor pump includes a second pump that selectively circulates the second axle oil through the second axle closed-loop hydraulic circuit;
   wherein a second electric motor is coupled to the second pump to selectively engage the second pump;
   a second temperature sensor that identifies an axle temperature of the second axle assembly;
   wherein, the controller selectively engages the second electric motor when the second temperature sensor identifies that the axle temperature of the second axle assembly is above the high temperature threshold;
   wherein the second axle closed-loop hydraulic circuit is a closed system and does not receive and does not share hydraulic fluid with the main vehicle hydraulic system.

13. The system of claim 12, further wherein when the first temperature sensor identifies that the axle temperature of the first axle assembly is above the high temperature threshold and the second temperature sensor identifies that the axle temperature of the second axle assembly is below the high temperature threshold and the controller engages only the first electric motor to provide fluid flow through the first axle closed-loop hydraulic circuit.

14. The system of claim 12, further comprising:
   a third axle assembly having a third axle closed-loop hydraulic circuit, wherein the third axle closed-loop hydraulic circuit operates independently of the main hydraulic system and does not depend on fluid flow of the main hydraulic fluid to circulate a third axle oil through the third axle closed-loop hydraulic circuit;
   a third brake assembly positioned at least partially within the third axle assembly;
   a third motor pump that selectively circulates the third axle oil through the third axle closed-loop hydraulic circuit, wherein the third motor pump includes a third pump powered by a third electric motor;

wherein the third electric motor is coupled to the third pump to selectively engage the third pump;

a third temperature sensor that identifies an axle temperature of the third axle assembly;

wherein, the controller selectively engages the third electric motor when the third temperature sensor identifies that the axle temperature of the third axle assembly is above the high temperature threshold, and wherein the third axle closed-loop hydraulic circuit is a closed system and does not receive and does not share hydraulic fluid with the main vehicle hydraulic system.

15. The system of claim 14, further wherein the controller independently powers any one or more of the first electric motor, the second electric motor, or the third electric motor when the corresponding first temperature sensor, second temperature sensor, or third temperature sensor indicate the axle temperature of the corresponding first axle assembly, second axle assembly, or third axle assembly is above the high temperature threshold.

16. A method for controlling an axle cooling system for a vehicle, comprising:

providing a first axle assembly, a first motor pump that selectively provides fluid flow through a first axle closed-loop hydraulic circuit, wherein the first motor pump includes a first electric motor coupled to a first pump, a second axle assembly, a second motor pump that selectively provides fluid flow through a second axle closed-loop hydraulic circuit, wherein the second motor pump includes a second electric motor coupled to a second pump, and a controller in communication with a first temperature sensor that identifies a first axle temperature and a second temperature sensor that identifies a second axle temperature, wherein the first axle closed-loop hydraulic circuit and the second axle closed-loop hydraulic circuit operate independently of a main hydraulic system and do not depend on fluid flow of a main hydraulic fluid of the main hydraulic system to circulate a first axle oil through the first axle closed-loop hydraulic circuit or to circulate a second axle oil through the second axle closed-loop hydraulic circuit, wherein each of the first axle closed-loop hydraulic circuit and the second axle closed-loop hydraulic circuit is a closed system to prevent cross axle contamination;

monitoring, with the controller, the first temperature sensor to identify the first axle temperature;

monitoring, with the controller, the second temperature sensor to identify the second axle temperature;

comparing the first and second axle temperature to a temperature threshold; and initiating a cooling response, with the controller, in either of the first axle assembly or the second axle assembly when the corresponding first or second axle temperature is above a temperature threshold;

wherein, when the first axle temperature is above the temperature threshold and the second axle temperature is below the temperature threshold, the cooling response is initiated in the first axle closed-loop hydraulic circuit by activating the first motor pump and the cooling response is not initiated in the second axle close-loop hydraulic circuit and activation of the first motor pump does not activate the second motor pump.

17. The method of controlling the axle cooling system of claim 16, wherein, the initiating a cooling response step comprises providing instructions from the controller to power the corresponding first electric motor or second electric motor to provide fluid flow through the corresponding first axle closed-loop hydraulic circuit or second axle closed-loop hydraulic circuit.

18. The method of controlling the axle cooling system of claim 17, further comprising:

providing a first inverter that selectively couples the first electric motor to an alternator and a second inverter that selectively couples the second electric motor to the alternator;

wherein, the initiating a cooling response step comprises providing instructions from the controller to the first inverter and second inverter to power the corresponding first or second motor.

19. The method of controlling the axle cooling system of claim 16, further comprising:

providing a third axle assembly, a third motor pump that selectively provides fluid flow through a third axle closed-loop hydraulic circuit, wherein the third motor pump includes a third electric motor coupled to a third pump, and a third temperature sensor that identifies a third axle temperature to the controller, wherein the third axle closed-loop hydraulic circuit is a closed system with respect to both the first axle closed-loop hydraulic circuit and the second axle closed-loop hydraulic circuit to prevent cross axle contamination;

monitoring, with the controller, the third temperature sensor to identify the third axle temperature;

comparing the third axle temperature to the temperature threshold; and initiating the cooling response, with the controller, in the third axle assembly when the third axle temperature is above the temperature threshold;

wherein, the controller only initiates the cooling response in the first, second, or third axle assembly that has a corresponding first, second, or third axle temperature that is above the temperature threshold.

* * * * *